United States Patent
Gasparakis et al.

(10) Patent No.: US 11,888,710 B2
(45) Date of Patent: Jan. 30, 2024

(54) TECHNOLOGIES FOR MANAGING CACHE QUALITY OF SERVICE

(71) Applicant: Intel Corporation, Santa Clara, CA (US)

(72) Inventors: Iosif Gasparakis, Hillsboro, OR (US); Malini Bhandaru, San Jose, CA (US); Ranganath Sunku, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1202 days.

(21) Appl. No.: 16/140,938

(22) Filed: Sep. 25, 2018

(65) Prior Publication Data

US 2019/0044828 A1 Feb. 7, 2019

(51) Int. Cl.
| | |
|---|---|
| *H04L 41/5003* | (2022.01) |
| *G06F 12/084* | (2016.01) |
| *G06F 9/455* | (2018.01) |
| *H04L 43/08* | (2022.01) |
| *H04L 47/70* | (2022.01) |

(Continued)

(52) U.S. Cl.
CPC ...... *H04L 41/5003* (2013.01); *G06F 9/45558* (2013.01); *G06F 12/084* (2013.01); *G06F 12/0864* (2013.01); *H04L 43/08* (2013.01); *H04L 47/82* (2013.01); *H04L 67/568* (2022.05); *G06F 2009/4557* (2013.01); *G06F 2009/45583* (2013.01); *G06F 2009/45595* (2013.01);

(Continued)

(58) Field of Classification Search
CPC ... G06F 2212/6032; G06F 2009/45583; G06F 2009/45579
See application file for complete search history.

(56) References Cited

U.S. PATENT DOCUMENTS

| | | | | |
|---|---|---|---|---|
| 6,604,174 B1 * | 8/2003 | Dean | ................... | G06F 12/0853 711/149 |
| 8,738,860 B1 * | 5/2014 | Griffin | ................ | G06F 12/0897 711/122 |

(Continued)

OTHER PUBLICATIONS

"Are Noisry Neighbors in Your Data Center Keeping You Up at Night?", https://www.intel.com/content/dam/www/public/us/en/documents/white-papers/intel-rdt-infrastructure-paper.pdf. Printed Dec. 17, 2021.*

(Continued)

*Primary Examiner* — Douglas B Blair
(74) *Attorney, Agent, or Firm* — Compass IP Law PC

(57) ABSTRACT

Technologies for managing cache quality of service (QoS) include a compute node that includes a network interface controller (NIC) configured to identify a total amount of available shared cache ways of a last level cache (LLC) of the compute node and identify a destination address for each of a plurality of virtual machines (VMs) managed by the compute node. The NIC is further configured to calculate a recommended amount of cache ways for each workload type associated with VMs based on network traffic to be received by the NIC and processed by each of the VMs, wherein the recommended amount of cache ways includes a recommended amount of hardware I/O LLC cache ways and a recommended amount of isolated LLC cache ways usable to update a cache QoS register that includes the recommended amount of cache ways for each workload type. Other embodiments are described herein.

27 Claims, 6 Drawing Sheets

(51) Int. Cl.
*G06F 12/0864* (2016.01)
*H04L 67/568* (2022.01)
(52) U.S. Cl.
CPC ............... *G06F 2212/1024* (2013.01); *G06F 2212/154* (2013.01); *G06F 2212/6032* (2013.04)

(56) References Cited

U.S. PATENT DOCUMENTS

| | | | |
|---|---|---|---|
| 2014/0095691 A1 | 4/2014 | Ganguli | |
| 2015/0295791 A1* | 10/2015 | Cropper | H04L 41/0896 709/226 |
| 2015/0295792 A1* | 10/2015 | Cropper | H04L 43/0817 709/226 |
| 2016/0182345 A1* | 6/2016 | Herdrich | H04L 41/5025 709/224 |
| 2018/0293965 A1* | 10/2018 | Vembu | G09G 5/363 |
| 2019/0042388 A1* | 2/2019 | Wang | G06F 12/121 |
| 2021/0026769 A1* | 1/2021 | Bhandaru | G06F 9/5016 |

OTHER PUBLICATIONS

Extended European search report for European patent application No. 19183089.2, dated Jan. 13, 2020 (11 pages).
Selfa Vicent et al: "Application Clustering Policies to Address System Fairness with Intel's Cache Allocation Technology", 2017 26th International Conference on Parallel Architectures and Compilation Techniques (PACT), IEEE, Sep. 9, 2017 (Sep. 9, 2017), pp. 194-205.

* cited by examiner

TECHNOLOGIES FOR MANAGING CACHE QUALITY OF SERVICE

BACKGROUND

In present packet-switched network architectures, data is transmitted in the form of network packets between networked computing devices. At a high level, data is packetized into a network packet at one computing device and is transmitted, via a transmission device (e.g., a network interface controller (NIC) of the computing device), to another computing device. Upon receipt of a network packet, the computing device stores at least a portion of the data associated with the received network packet in memory and caches information associated with the received network packet, such as the address in memory that the data of the received network packet has been stored (e.g., in an associated descriptor). The computing device may be configured to allow control of a shared cache (e.g., last level cache) to one or more physical and/or virtual components of the computing device, such as the operating system, a hypervisor/virtual machine manager, etc., based on one or more class of service (COS) rules that identify which portions of the shared cache a processor can access. Accordingly, the processor is configured to obey the COS rules when running an application thread/process.

As multithreaded and multicore platform architectures continue to evolve, running workloads in single-threaded, multithreaded, or complex virtual machine environment such as in Network Function Virtualization (NFV) cloud deployments, the shared cache and memory bandwidth on the central processing unit (CPU) are key resources to manage and utilize based on the nature of workloads. However, constructing the right COS associations, particularly in NFV cloud deployments, to obtain optimal performance at run time and meet service level agreements (SLAs) is practically quite difficult, and typically requires real-time adjustment of shared cache COS associations to fine tune shared cache usage by a workload of interest. For example, an administrator typically has to ensure data transfers using direct to hardware I/O (e.g., using Intel® Data Direct I/O (DDIO) technology) based cache ways are to be associated with I/O intensive workloads instead of noisy neighbors to guarantee optimal performance. As such, determining optimal cache association and preventing noisy neighbors thrash cache at run-time is often difficult and generally requires run-time behavioral analysis and shared cache usage profiles.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
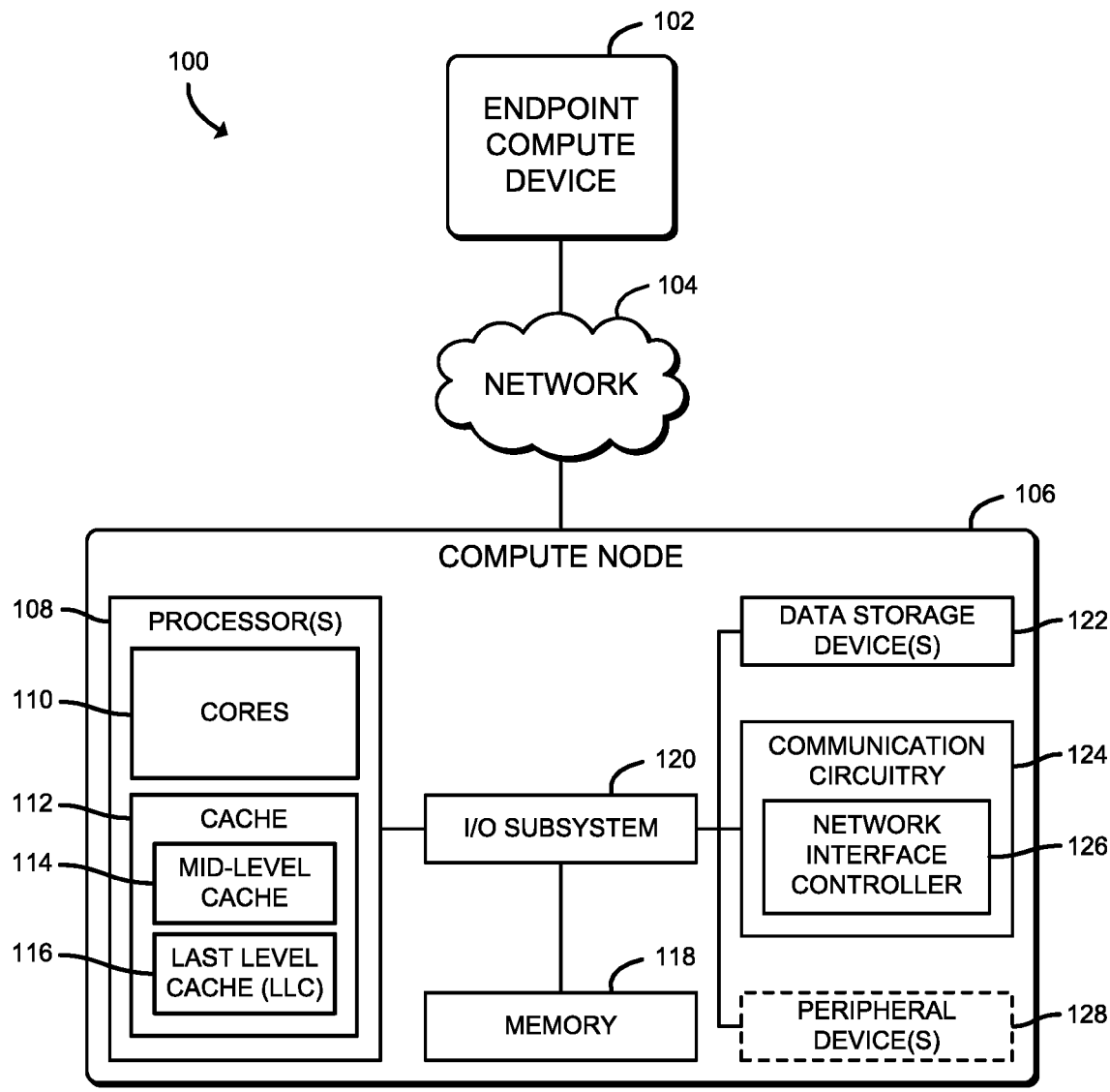
FIG. 1 is a simplified block diagram of at least one embodiment of a system for managing cache quality of service (QoS) that includes an endpoint compute device and a compute node communicatively coupled via a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for managing cache quality of service (QoS) includes an endpoint compute device 102 communicatively coupled to a compute node 106 via a network 104. While illustratively shown as having a single endpoint compute device 102 and a single compute node 106, the system 100 may include multiple endpoint compute devices 102 and multiple compute nodes 106, in other embodiments. It should be appreciated that the endpoint compute device 102 and the compute node 106 have been illustratively described herein, respectively, as being one of a "source" of network traffic (i.e., the endpoint compute device 102) and a "destination" of the network traffic (i.e., the compute node 106) for the purposes of providing clarity to the description. It should be further appreciated that, in some embodiments, the endpoint compute device 102 and the compute node 106 may reside in the same data center or high-performance computing (HPC) environment. In other words, the endpoint compute device 102 and compute node 106 may reside in the same network 104 connected via one or more wired and/or wireless interconnects.

The compute node 106, or more particularly a network interface controller (NIC) 126 of the compute node 106, is configured to assist control cache QoS by using a cache QoS register map on hardware of the NIC 126 that is controlled by firmware of the NIC 126. Accordingly, unlike present technologies employing a top-down approach of obtaining a cache allocation/association policy for set of workload(s) from the Management and Orchestration (MANO) layer, the NIC 126 is configured to consider real time statistics to help a kernel or user space software provide low latency cache QoS for workloads of interest. As such, the NIC 126 can provide low latency proactive cache QoS (e.g., on a per non-uniform memory access (NUMA) node basis) proactively, instead of existing software based reactive solutions.

To do so, the NIC 126 is configured to manage a cache QoS register that can represent hints from the NIC 126 to a resource management enabled platform, such as the Intel® Resource Director Technology (RDT) set of technologies (e.g., Cache Allocation Technology (CAT), Cache Monitoring Technology (CMT), Code and Data Prioritization (CDP), Memory Bandwidth Management (MBM), etc.). In use, the NIC 126 writes a higher or lower cache requirement bit mask and cache ways requirements onto the cache QoS register based on a set of predefined Key Performance Indicator (KPI) based heuristics (e.g., a number of packets per second received for a particular one or more destination addresses of interest and/or virtual functions, in the case of single root input/output virtualization (SR-IOV)) that have been previously written into firmware of the NIC 126.

Depending on the embodiment, the cache QoS register indicates an amount of direct to hardware I/O (e.g., Intel® Data Direct I/O (DDIO)) data transfer cache ways (i.e., associativity ways) that are determined to be optimal for the workload based on oncoming traffic heuristics received in real time. It should be appreciated that the direct to hardware I/O may be any type of I/O architecture in which hardware (e.g., NICs, controllers, hard disks, etc.) talk directly to a processor cache without a detour (e.g., via system memory). As such, the direct to hardware I/O can make the processor cache the primary destination and source of I/O data rather than main memory. Accordingly, by avoiding system memory, direct to hardware I/O can reduce latency, increase system I/O bandwidth, and reduce power consumption attributable to memory reads and writes. It should be further appreciated that the cache QoS register is write accessible only by firmware of the NIC 126.

Additionally, the NIC 126 is configured to generate an interrupt after updating the cache QoS register, which is usable by the receiving kernel to indicate that the values have been updated. Accordingly, the updated values can be read by the kernel and passed on to a kernel/user space agent, such as a resource management daemon, that is configured to control and manage cache associations to the workloads on the compute node 106 platform for optimal performance. As such, unlike a kernel/user space based software monitoring approach, which adds computation cycles and hence latency in decision making and adjusting the direct to hardware I/O and/or regular cache ways, recommendations on scaling direct to hardware I/O cache ways, cache way adjustments, etc., could be calculated ahead of received network packets reaching their intended virtual workload.

The compute node 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart network interface controller (NIC)/HFI, a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 1, the illustrative compute node 106 includes one or more processors 108, memory 118, an I/O subsystem 120, one or more data storage devices 122, communication circuitry 124, a DMA copy engine 130, and, in some embodiments, one or more peripheral devices 128. It should be appreciated that the compute node 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The processor(s) 108 may be embodied as any type of device or collection of devices capable of performing the various compute functions as described herein. In some embodiments, the processor(s) 108 may be embodied as one or more multi-core processors, digital signal processors (DSPs), microcontrollers, or other processor(s) or processing/controlling circuit(s). In some embodiments, the processor(s) 108 may be embodied as, include, or otherwise be coupled to an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein.

The illustrative processor(s) 108 includes multiple processor cores 110 (e.g., two processor cores, four processor cores, eight processor cores, sixteen processor cores, etc.) and a cache memory 112. Each of processor cores 110 may be embodied as an independent logical execution unit capable of executing programmed instructions. It should be appreciated that, in some embodiments, the compute node 106 (e.g., in supercomputer embodiments) may include thousands of processor cores. Each of the processor(s) 108 may be connected to a physical connector, or socket, on a motherboard (not shown) of the compute node 106 that is configured to accept a single physical processor package (i.e., a multi-core physical integrated circuit). Further, each the processor cores 110 is communicatively coupled to at least a portion of the cache memory 112 and functional units usable to independently execute programs, operations, threads, etc.

The cache memory 112, which may be embodied as any type of cache that the processor(s) 108 can access more quickly than the memory 118 (i.e., main memory), such as an on-die cache, or on-processor cache. In other embodiments, the cache memory 112 may be an off-die cache, but reside on the same system-on-a-chip (SoC) as a processor 108. The illustrative cache memory 112 includes a multi-level cache architecture embodied as a mid-level cache (MLC) 114 and a last-level cache (LLC) 116. The MLC 114 may be embodied as a cache memory dedicated to a particular one of the processor cores 110. Accordingly, while illustratively shown as a single MLC 114, it should be appreciated that there may be at least one MLC 114 for each processor core 110, in some embodiments.

The LLC 116 may be embodied as a cache memory, typically larger than the MLC 114 and shared by all of the processor cores 110 of a processor 108. In an illustrative example, the MLC 114 may be embodied as a level 1 (L1) cache and a level 2 (L2) cache, while the LLC 116 may be embodied as a layer 3 (L3) shared cache. It should be appreciated that, in some embodiments, the multi-level cache architecture may include additional and/or alternative levels of cache memory. While not illustratively shown in FIG. 1, it should be further appreciated that the cache memory 112 includes a memory controller (see, e.g., the cache manager 208 of FIG. 2), which may be embodied as a controller circuit or other logic that serves as an interface between the processor(s) 108 and the memory 118.

The memory 118 may be embodied as any type of volatile or non-volatile memory or data storage capable of performing the functions described herein. In operation, the memory 118 may store various data and software used during operation of the compute node 106, such as operating systems, applications, programs, libraries, and drivers. It should be appreciated that the memory 118 may be referred to as main memory (i.e., a primary memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

Each of the processor(s) 108 and the memory 118 are communicatively coupled to other components of the compute node 106 via the I/O subsystem 120, which may be embodied as circuitry and/or components to facilitate input/output operations with the processor(s) 108, the memory 118, and other components of the compute node 106. For example, the I/O subsystem 120 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 120 may form a portion of a SoC and be incorporated, along with one or more of the processors 108, the memory 118, and other components of the compute node 106, on a single integrated circuit chip.

The one or more data storage devices 122 may be embodied as any type of storage device(s) configured for short-term or long-term storage of data, such as, for example, memory devices and circuits, memory cards, hard disk drives, solid-state drives, or other data storage devices. Each data storage device 122 may include a system partition that stores data and firmware code for the data storage device 122. Each data storage device 122 may also include an operating system partition that stores data files and executables for an operating system.

The communication circuitry 124 may be embodied as any communication circuit, device, or collection thereof, capable of enabling communications between the compute node 106 and other computing devices, such as the endpoint compute device 102, as well as any network communication enabling devices, such as an access point, switch, router, etc., to allow communication over the network 104. Accordingly, the communication circuitry 124 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 124 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the compute node 106, etc.), performing computational functions, etc.

In some embodiments, performance of one or more of the functions of communication circuitry 124 as described herein may be performed by specialized circuitry, hardware, or combination thereof of the communication circuitry 124, which may be embodied as a SoC or otherwise form a portion of a SoC of the compute node 106 (e.g., incorporated on a single integrated circuit chip along with one of the processor(s) 108, the memory 118, and/or other components of the compute node 106). Alternatively, in some embodiments, the specialized circuitry, hardware, or combination thereof may be embodied as one or more discrete processing units of the compute node 106, each of which may be capable of performing one or more of the functions described herein.

The illustrative communication circuitry 124 includes the NIC 126, which may be embodied as one or more add-in-boards, daughtercards, network interface cards, controller chips, chipsets, or other devices that may be used by the compute node 106 to connect with another compute device (e.g., the endpoint compute device 102). In some embodiments, the NIC 126 may be embodied as part of a SoC that includes one or more processors, or included on a multichip package that also contains one or more processors. In some embodiments, the NIC 126 may include a local processor (not shown) and/or a local memory (not shown) that are both local to the NIC 126. In such embodiments, the local processor of the NIC 126 may be capable of performing one or more of the functions of a processor 108 described herein. Additionally or alternatively, in such embodiments, the local memory of the NIC 126 may be integrated into one or more components of the compute node 106 at the board level, socket level, chip level, and/or other levels.

The one or more peripheral devices 128 may include any type of device that is usable to input information into the compute node 106 and/or receive information from the compute node 106. The peripheral devices 128 may be embodied as any auxiliary device usable to input information into the compute node 106, such as a keyboard, a mouse, a microphone, a barcode reader, an image scanner, etc., or output information from the compute node 106, such as a display, a speaker, graphics circuitry, a printer, a projector, etc. It should be appreciated that, in some embodiments, one or more of the peripheral devices 128 may function as both an input device and an output device (e.g., a touchscreen display, a digitizer on top of a display screen, etc.). It should be further appreciated that the types of peripheral devices 128 connected to the compute node 106 may depend on, for example, the type and/or intended use of the compute node 106. Additionally or alternatively, in some embodiments, the peripheral devices 128 may include one or more ports, such as a USB port, for example, for connecting external peripheral devices to the compute node 106.

The DMA copy engine 130 may be embodied as any type of software, firmware, and/or hardware device that is usable to execute a DMA operation to copy data from on segment/cache line to another segment/cache line in shared data (e.g., the LLC 116). It should be appreciated that, depending on the embodiment, the DMA copy engine 130 may include a driver and/or controller for managing the source/destination address retrieval and the passing of the data being copied via the DMA operations. It should be further appreciated that the DMA copy engine 130 is purposed to perform contested writes, which could otherwise cause a significant performance degradation in the distribution core (e.g., core stalls due to cross-core communications).

The endpoint compute device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that endpoint compute device 102 includes similar and/or like components to those of the illustrative compute node 106. As such, figures and descriptions of the like components are not repeated herein for clarity of the description with the understanding that the description of the corresponding components provided above in regard to the compute node 106 applies equally to the corresponding components of the endpoint compute device 102. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the compute node 106 and the endpoint compute device 102, which are not shown to preserve clarity of the description.

Figure 2:
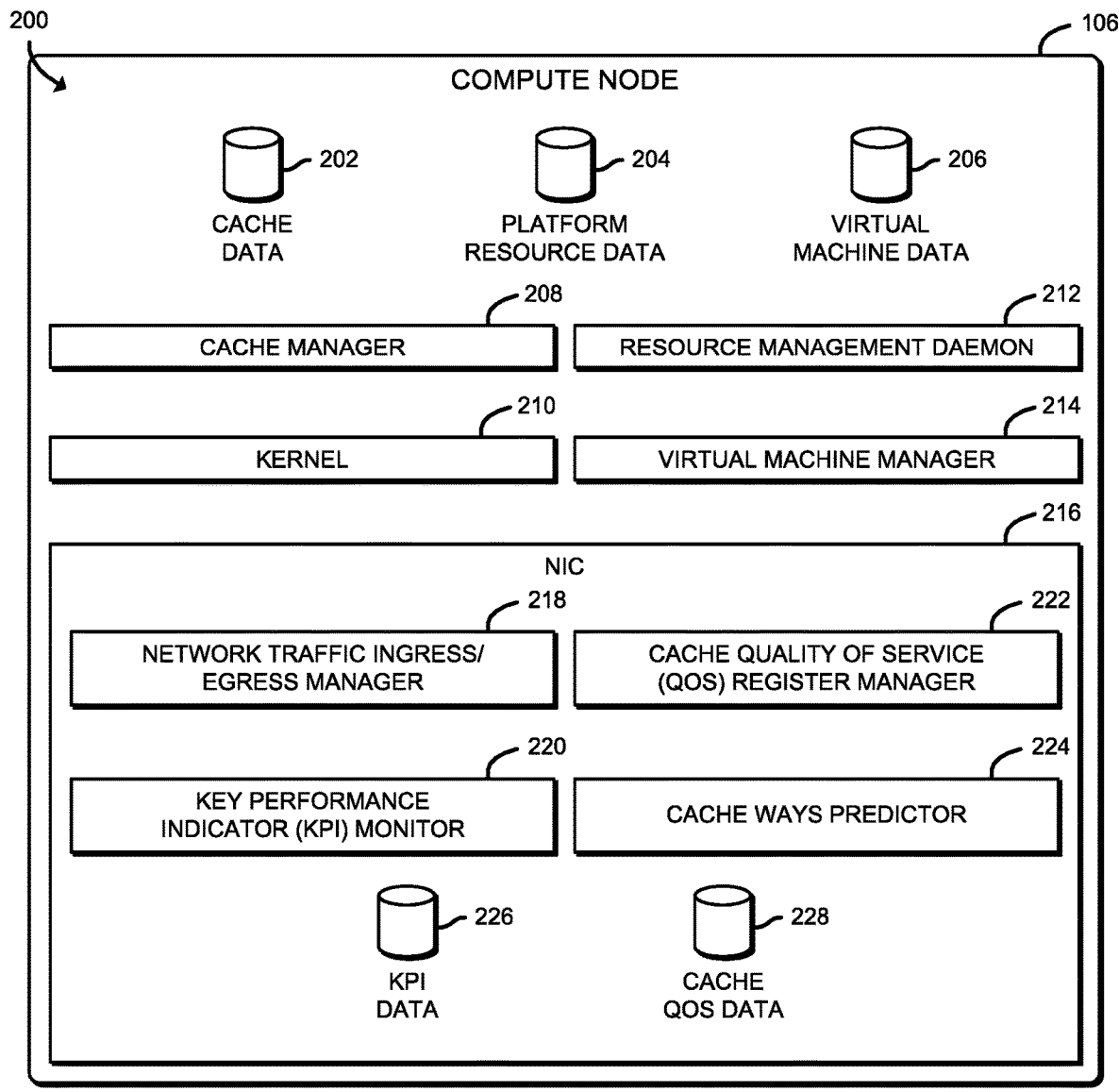
FIG. 2 is a simplified block diagram of at least one embodiment of an environment of the compute node of the system of FIG. 1.

Referring now to FIG. 2, in use, the compute node 106 establishes an environment 200 during operation. The illustrative environment 200 includes a cache manager 208, a kernel 210, a resource management daemon 212, a virtual machine manager (VMM) 214, and the NIC 216 of FIG. 2. The illustrative NIC 216 includes a network traffic ingress/egress manager 218, a key performance indicator (KPI) monitor 220, a cache QoS register manager 222, and a cache ways predictor 224. The various components of the environment 200 may be embodied as hardware, firmware, software, or a combination thereof. As such, in some embodiments, one or more of the components of the environment 200 may be embodied as circuitry or collection of electrical devices (e.g., cache management circuitry 208, network traffic ingress/egress management circuitry 218, KPI monitoring circuitry 220, cache QoS register management circuitry 222, cache ways prediction circuitry 224, etc.).

As illustratively shown, the cache management circuitry 208, the network traffic ingress/egress management circuitry 218, the KPI monitoring circuitry 220, the cache QoS register management circuitry 222, and the cache ways prediction circuitry 224 form a respective portion of the NIC 216 of the compute node 106. However, while illustratively shown as being performed by a particular component of the compute node 106, it should be appreciated that, in other embodiments, one or more functions described herein as being performed by a particular component of the compute node 106 may be performed, at least in part, by one or more other components of the compute node 106, such as the one or more processors 108, the I/O subsystem 120, the communication circuitry 124, an ASIC, a programmable circuit such as an FPGA, and/or other components of the compute node 106. It should be further appreciated that associated instructions may be stored in the cache memory 112, the memory 118, the data storage device(s) 122, and/or other data storage location, which may be executed by one of the processors 108 and/or other computational processor of the compute node 106.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the NIC 126, the processor(s) 108, or other components of the compute node 106. It should be appreciated that the compute node 106 may include other components, sub-components, modules, sub-modules, logic, sub-logic, and/or devices commonly found in a computing device, which are not illustrated in FIG. 2 for clarity of the description.

In the illustrative environment 200, the compute node 106 additionally includes cache data 202, platform resource data 204, and virtual machine data 206, each of which may be accessed by the various components and/or sub-components of the compute node 106. The illustrative NIC 216 additionally includes KPI data 226 and cache data 228. Each of the cache data 202, the platform resource data 204, the virtual machine data 206, the KPI data 226, and the cache QoS data 228 may be accessed by the various components of the compute node 106. Additionally, it should be appreciated that in some embodiments the data stored in, or otherwise represented by, each of the cache data 202, the platform resource data 204, the virtual machine data 206, the KPI data 226, and the cache QoS data 228 may not be mutually exclusive relative to each other. For example, in some implementations, data stored in the cache data 202 may also be stored as a portion of one or more of the platform resource data 204 and/or the virtual machine data 206, or in another alternative arrangement. As such, although the various data utilized by the compute node 106 is described herein as particular discrete data, such data may be combined, aggregated, and/or otherwise form portions of a single or multiple data sets, including duplicative copies, in other embodiments.

The cache manager 208, which may be embodied as hardware, firmware, software, virtualized hardware, emulated architecture, and/or a combination thereof as discussed above, is configured to manage the cache memory 112 (e.g., the MLC 114 and the LLC 116). To do so, the cache manager 208 is configured to manage the addition and eviction of entries into and out of the cache memory 112. Accordingly the cache manager 208, which may be embodied as or otherwise include a memory management unit, is further configured to record results of virtual address to physical address translations. In such embodiments, the translations may be stored in the cache data 202. The cache manager 208 is additionally configured to facilitate the fetching of data from main memory (e.g., the memory 118 of FIG. 1) and the storage of cached data to main memory, as well as the demotion of data from the applicable MLC 114 to the LLC 116 and the promotion of data from the LLC 116 to the applicable MLC 114.

The kernel 210 is configured to handle start-up of the compute node 106, as well as I/O requests (e.g., from the NIC 216, from software applications executing on the compute node 106, etc.) and translate the received I/O requests into data-processing instructions for a processor core. The resource management daemon 212 is configured to respond to network requests, hardware activity, or other programs by performing some task. In particular, the resource management daemon 212 is configured to perform resource allocation, including cache (e.g., the cache memory 112 of FIG. 1) of the compute node 106. For example, resource management daemon 212 is configured to determine the allocation of cache resources for each processor core of the (e.g., each of the processor cores 110 of FIG. 1).

To do so, the resource management daemon 212 may monitor telemetry data of particular physical and/or virtual resources of the compute node 106. Accordingly, it should be appreciated that the resource management daemon 212 may be configured to perform a discovery operation to identify and collect information/capabilities of those physical and/or virtual resources (i.e., platform resources) to be monitored. Additionally, the resource management daemon 212 may be configured to rely on input to perform the resource allocation. It should be appreciated that the resource management daemon 212 may be started at boot time. In some embodiments, the monitored telemetry data, collected platform resource data, etc., may be stored in the platform resource data 204.

The virtual machine manager 214, which may be embodied as hardware, firmware, software, virtualized hardware, emulated architecture, and/or a combination thereof as discussed above, is configured to create and run virtual machines (VMs). To do so, the virtual machine manager 214 is configured to present a virtual operating platform to guest operating systems and manage the execution of the guest operating systems on the VMs. As such, multiple instances of a variety of operating systems may share the virtualized hardware resources of the compute node 106. It should be appreciated that the compute node 106 is commonly referred to as a "host" machine with "host" physical resources and each VM is commonly referred to as a "guest" machine with access to virtualized physical/hardware resources of the "host" machine. Depending on the embodiment, the virtual machine manager 214 may be configured to create or otherwise manage the communications between VMs (see, e.g., the illustrative VMs 604 of FIG. 3). In some embodiments, information associated with the VMs may be stored in the virtual machine data 206.

The network traffic ingress/egress manager 218, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 218 is configured to facilitate inbound network communications (e.g., network traffic, network packets, network flows, etc.) to the compute node 106 (e.g., from the endpoint compute device 102). Accordingly, the network traffic ingress/egress manager 218 is configured to manage (e.g., create, modify, delete, etc.) connections to physical and virtual network ports (i.e., virtual network interfaces) of the compute node 106 (e.g., via the communication circuitry 124), as well as the ingress buffers/queues associated therewith. Additionally, the network traffic ingress/egress manager 218 is configured to facilitate outbound network communications (e.g., network traffic, network packet streams, network flows, etc.) from the compute node 106. To do so, the network traffic ingress/egress manager 218 is configured to manage (e.g., create, modify, delete, etc.) connections to physical and virtual network ports/interfaces of the compute node 106 (e.g., via the communication circuitry 124), as well as the egress buffers/queues associated therewith.

The KPI monitor 220, which may be embodied as hardware, firmware, software, virtualized hardware, emulated architecture, and/or a combination thereof as discussed above, is configured to monitor one or more KPIs. The KPIs may include any type of metric that is usable to quantity a performance level to be evaluated. For example, to monitor device health, the key performance indicators can include delay, jitter, throughput, latency, packet loss, transmission/receive errors, resource (e.g., processor and memory) utilization. The KPI monitor 220 may be configured to identify and track different KPIs based on a characteristic of network traffic, such as a destination address associated with a received network packet (e.g., a packet per second received for a particular destination address).

In an illustrative embodiment in which the NIC 216 is embodied as an SR-IOV enabled NIC, as network packets arrive at virtual functions (VFs), the KPI monitor 220 may keep track of pre-programmed KPIs, such as packet per second for each destination of the respective VFs. In another illustrative embodiment in which the NIC 216 is embodied as a smart NIC, wherein processor cores or an accelerator would have offloaded components of a virtual switch which could keep track of destination addresses of workloads, the KPI monitor 220 could track the statistics of KPIs, such as packets per second received for each destination.

Figure 7:
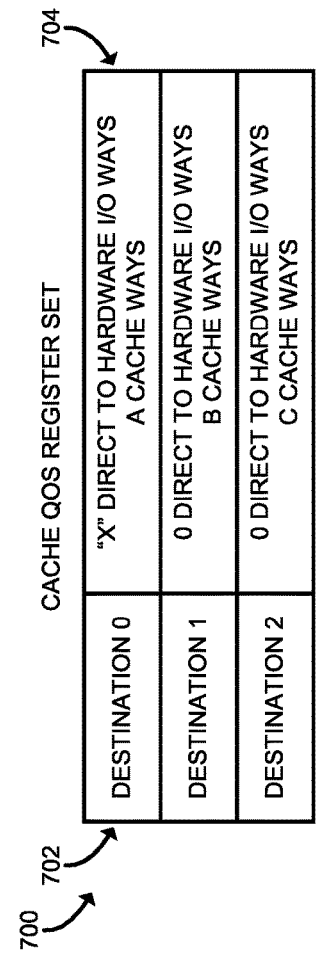
FIG. 7 is a simplified illustration of at least one embodiment of a cache QoS register associated with the NIC of the compute node of FIGS. 1 and 2.

The cache QoS register manager 222, which may be embodied as hardware, firmware, software, virtualized hardware, emulated architecture, and/or a combination thereof as discussed above, is configured to manage the cache QoS register (see, e.g., the illustrative cache QoS register 700 of FIG. 7). For example, the cache QoS register manager 222 is configured to initialize the register, update the register (e.g., based on instruction received from the cache ways predictor 224), provide register information to a requesting entity, etc.

The cache ways predictor 224, which may be embodied as hardware, firmware, software, virtualized hardware, emulated architecture, and/or a combination thereof as discussed above, is configured to provide proactive low latency recommendations of cache way associations and direct to hardware I/O cache way scale for particular destination addresses associated with a particular workload. To do so, the cache ways predictor 224 is configured to determine the recommendations, or hints, and update the cache QoS register (e.g., via the cache QoS register manager 222) to reflect the determined recommendations.

Additionally, depending on the embodiment, the cache ways predictor 224 may be configured to use heuristics to determine the cache requirement recommendations for a particular workload. For example, a particular night of the week may see more video streaming workloads than other nights of the week. As such, network traffic characteristics, such time of the day, packet payload type, destination headers, etc., could be used by the cache ways predictor 224 for determining heuristics that help suggest the cache requirements (e.g., the amount of direct to hardware I/O cache ways) for that workload type. Depending on the supported features of the host platform, such as those embodiments that support direct to hardware I/O scaling, it should be appreciated that the number of direct to hardware I/O cache ways could be a small set or an entire set of cache ways that the workload would occupy.

In another example, if the packet rate for a particular destination is very low over a pre-determined period of time, the cache ways predictor 224 may suggest to reduce the associated cache resources. Although that workload might be of high priority on the platform relative to other workloads, the cache ways predictor 224 could recommend to reduce the allocated cache ways for the workload, thereby creating added value of synergistically balancing compute resources.

Figure 3:
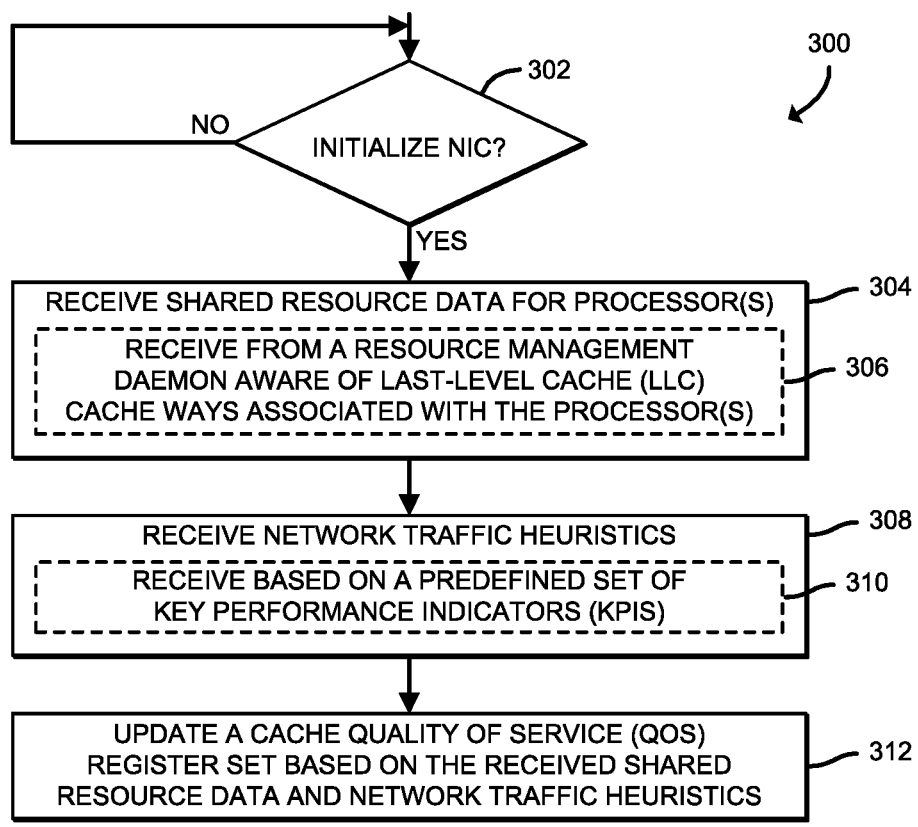
FIG. 3 is a simplified flow diagram of at least one embodiment of a method for initializing a network interface controller (NIC) of the compute node of FIGS. 1 and 2 that may be executed by the compute node.

Referring now to FIG. 3, a method 300 for initializing a NIC (e.g., the NIC 216 of FIGS. 1 and 2) of a compute device (e.g., the compute node 106 of FIGS. 1 and 2) is shown which may be executed by the NIC 216. The method 300 begins with block 302, in which the compute node 106 determines whether to initialize the NIC 216. If so, the method 300 advances to block 304, in which the NIC 216 receives shared resource data for one or more processor(s). To do so, in block 306, the NIC 216 may receive the shared resource data from a resource management daemon that is aware of the LLC cache ways associated with the processor (s). In other words, during initialization of the NIC 216, a kernel/user space daemon that is aware of processor cache ways may provide details of any resource management infrastructure registers for the specific processor(s) to the NIC 216. It should be appreciated that the LLC cache ways as referred to herein include the hardware I/O LLC cache ways (e.g., DDIO cache ways) and the isolated LLC cache ways (e.g., the non-DDIO cache ways).

In block 308, the NIC 216 receives network traffic heuristics (e.g., from the resource management daemon) at firmware of the NIC 216. In some embodiments, in block 310, the NIC 216 may receive the network traffic heuristics based on a predefined set of KPIs. Accordingly, it should be appreciated that the firmware of the NIC 216 would then be able to read the total value of LLC cache ways available (e.g., per NUMA node) on the platform using process identifiers to assist with heuristic calculations to factor an amount of LLC 116 available. In block 312, the NIC 216 updates the cache QoS register based on the received shared resource data and network traffic heuristics.

Figure 4:
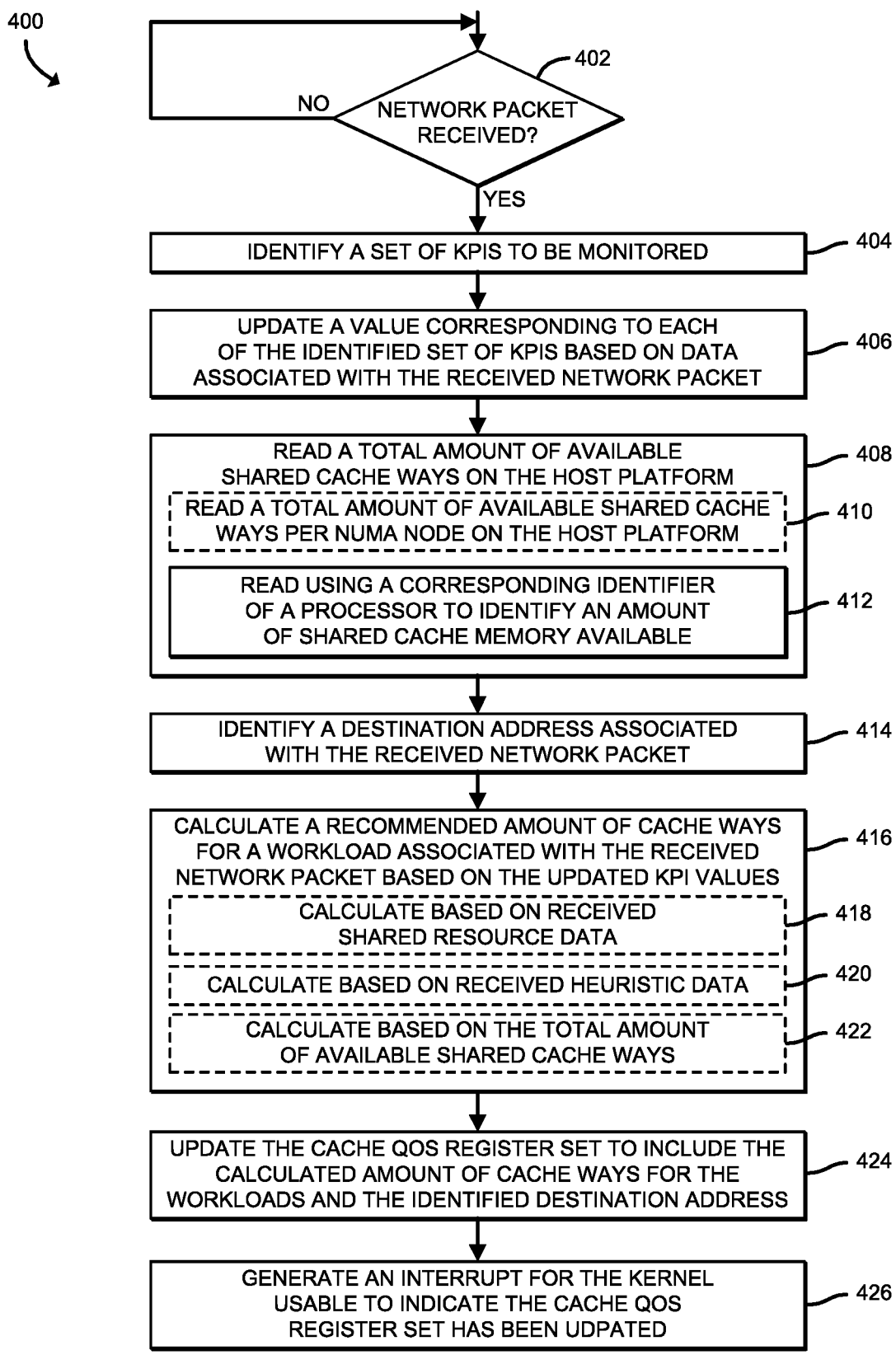
FIG. 4 is a simplified flow diagram of at least one embodiment of a method for updating a cache QoS register by the NIC that may be executed by the compute node of FIGS. 1 and 2.

Referring now to FIG. 4, a method 400 for updating a cache QoS register is shown which may be executed by a NIC (e.g., the NIC 216 of FIGS. 1 and 2) of a compute device (e.g., the compute node 106 of FIGS. 1 and 2). The method 400 begins with block 402, in which the NIC 216 determines whether a network packet has been received. For example, depending on the embodiment of the NIC 216, the network packet may arrive at a virtual function or a physical function. If the NIC 216 determines that a network packet has been received, the method 400 advances to block 404, in which the NIC 216 identifies a set of KPIs to be monitored. As described previously, the KPIs may include any type of metric that is usable to quantity a performance level to be evaluated. For example, the key performance indicators may include metrics associated with delay, jitter, throughput, latency, dropped packets, packet loss, transmission/receive errors, resource utilization (e.g., processor utilization, memory utilization, power utilization, etc.), etc.

In block 406, the NIC 216 updates a value corresponding to each of the identified set of KPIs based on data associated with the received network packet. In block 408, the NIC reads a total amount of available shared cache ways on the host platform (e.g., the compute and storage resources of the compute node 106). For example, in block 410, the NIC 216 may read a total amount of available shared cache ways per NUMA node on the host platform. Additionally or alternatively, in block 412, the NIC 216 reads the available shared cache ways using a corresponding identifier of a respective processor (e.g., via a CPUID) to identify an amount of available shared cache memory. In block 414, the NIC 216 identifies a destination address associated with the received network packet.

In block 416, the NIC 216 calculates a recommended amount of cache ways for a workload associated with the received network packet based on the updated KPI values. To do so, in block 418, the NIC 216 may perform the calculation based on data received in regard to shared resources (i.e., shared resource data). Additionally or alternatively, in block 420, the NIC 216 may calculate the recommended amount of cache ways based on received heuristic data. In block 422, the NIC 216 may additionally or alternatively perform the calculation based on the total amount of available shared cache ways. In block 424, the NIC 216 updates the cache QoS register to include the calculated amount of cache ways for the workloads and the identified destination address. In block 426, the NIC 216 generates an interrupt for a kernel (e.g., the kernel 210 of FIG. 2) that is usable to indicate that the cache QoS register has been updated.

Figure 5:
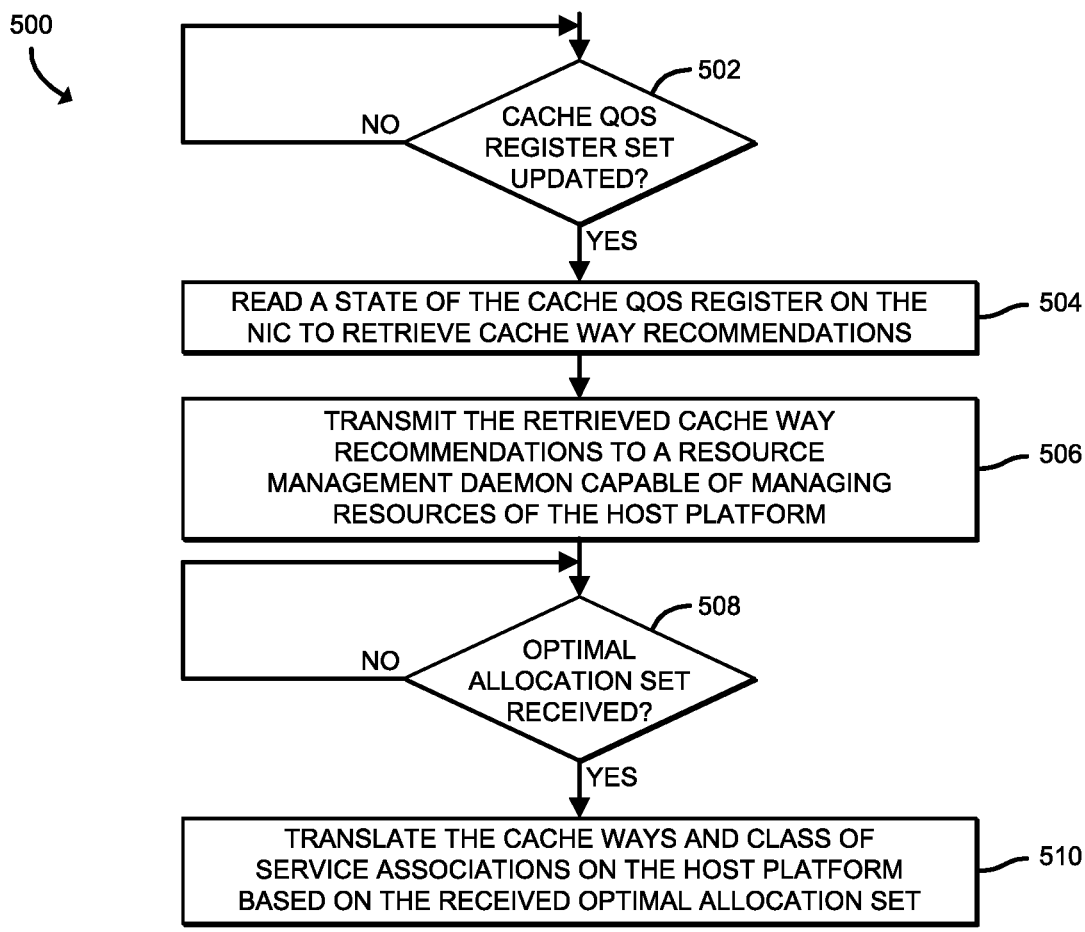
FIG. 5 is a simplified flow diagram of at least one embodiment of a method for updating cache ways and class of service associations that may be executed by the compute node of FIGS. 1 and 2.

Referring now to FIG. 5, a method 500 for updating cache ways and class of service associations is shown which may be executed by a kernel of a compute device (e.g., the kernel 210 of the compute node 106 of FIG. 2) that is communicatively coupled to a NIC (e.g., the NIC 216 of FIGS. 1 and 2). The method 500 begins with block 502, in which the kernel 210 determines whether a cache QoS register has been updated, such as by having received an interrupt from the NIC 216. If so, the method 500 advances to block 504, in which the kernel 210 reads a state of the cache QoS register on the NIC 216 to retrieve the cache way recommendations therefrom. It should be understood that the NIC 216 may not have real-time information on cache usage (e.g., via cache monitoring), and as such the final class of service associations could be constructed by the kernel 210 and/or user space agents (e.g., a resource management daemon), then be written to the kernel 210.

Accordingly, in such embodiments in which a user space agent finalizes the class of service associations the kernel 210, in block 506, transmits the retrieved cache way recommendations to a resource management daemon (e.g., the resource management daemon 212 of FIG. 2) that is capable of managing resources of the host platform. It should be appreciated that the resource management daemon 212 could then calculate an optimal allocation set based on the received cache way recommendations. It should be further appreciated that such agents (e.g., the resource management daemon) have full host platform view (e.g., across NUMA nodes) that provides the agents with full visibility into real-time cache associations with workloads of interest and allows the agents to choose to use the recommendations from the NIC 216 (i.e., from the cache QoS register) on direct to hardware I/O LLC cache ways and cache ways requirements based on a corresponding workload policy and/or priority.

Accordingly, it should be understood that the resource management daemon type agents know destination address mapping and overall cache availability on the platform. For example, under certain conditions in which the NIC 216, or more particularly the cache QoS register, suggests to use ten cache ways with at least six hardware I/O LLC cache ways for a destination address type that hosts a particular workload type, the resource management daemon may only choose to provide three hardware I/O LLC cache ways and a total of ten cache ways and a total of 10 cache ways to the workload (e.g., the three hardware I/O LLC cache ways and seven isolated LLC cache ways).

In block 508, the kernel 210 determines whether an optimal cache ways allocation set has been received from the resource management daemon, based on the transmitted cache way recommendations. If so, the method 500 advances to block 510, in which the kernel 210 translates the cache ways and class of service associations on the host platform based on the optimal cache ways allocation set received from the resource management daemon.

Figure 6:
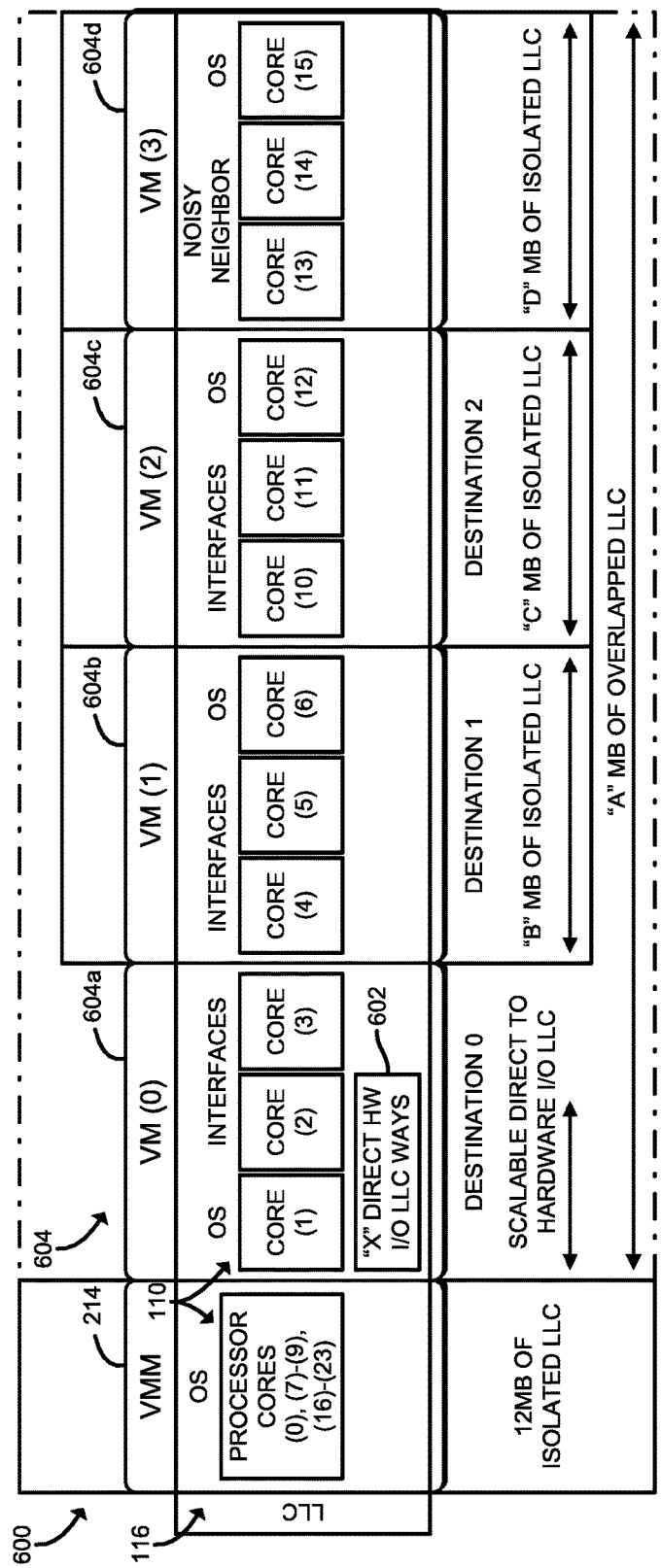
FIG. 6 is a simplified block diagram of at least one embodiment of a plurality of virtual machines managed by the compute node of FIGS. 1 and 2 illustrating cache line distribution for managing cache QoS.

Referring now to FIG. 6, an illustrative host platform environment 600 includes the virtual machine manager 214 of FIG. 2 and multiple VMs 604 managed by a compute node (e.g., the compute node 106 of FIGS. 1 and 2) are shown for illustrating cache line distribution based on the cache QoS register (see, e.g., the illustrative cache QoS register 700 of FIG. 7). As illustratively shown, the LLC 116 of FIG. 1 is illustratively shown as being distributed/allocated across each of the VMM 214 and the multiple VMs 604. The illustrative VMs 604 include a first VM 604 designated as VM (0) 604*a*, a second VM 604 designated as VM (1) 604*b*, a third VM 604 designated as VM (2) 604*c*, and a fourth VM 604 designated as VM (3) 604*d*.

As illustratively shown, the processor cores 110 of FIG. 1 (e.g., 24 processor cores) are distributed/allocated across each of the VMM 214 and the multiple VMs 604. For example, processor cores 110 designated as processor core (0), processor cores (7)-(9), and processor cores (16)-(23) are illustratively shown as being distributed/allocated to the VMM 214, while processor cores 110 designated as processor cores (1)-(3) are illustratively shown as being distributed/allocated to VM (0) 604*a*. As illustratively shown, one of the three processor cores 110 are allocated to an operating system associated with the VM (0) 604*a* and the remaining two processor cores 110 are allocated to interfaces of the VM (0) 604*a*. As also illustratively shown VM (1) 604*b* and VM (2) 604*c* have similar processor cores 110 allocated thereto.

Further, each of VM (0) 604*a*, VM (1) 604*b*, and VM (2) 604*c* are designated as destinations (e.g., VM (0) 604*a* has been designated as destination "0", VM (1) 604*b* has been designated as destination "1", and VM (2) 604*c* has been designated as destination "2"), whereas VM (0) 604*a* is designated as a "noisy neighbor". As such two of the three processor cores 110 allocated to VM (3) are considered "noisy neighbors". It should be appreciated that noisy neighbors can result from shared resources (e.g., the LLC 116) being consumed in extremis (e.g., within a multi-tenant environment), such as when one resources of one VM 604 are restricted by another VM 604 (e.g., VM (3) 604*d*).

It should be appreciated that only VM (0) 604*a* includes a variable number of direct to hardware I/O LLC cache ways 602, designated as "X" direct to hardware I/O LLC cache ways 602, wherein "X" is indicative of a number of cache ways and "X" is an integer value greater than or equal to zero. In other words, VM (0) 604*a* includes access to scalable direct to hardware I/O LLC cache ways; whereas the other VMs 604 (e.g., VM (1) 604*b*, VM (2) 604*c*, and VM (3) 604*d*) only have access to allocated amounts of isolated LLC 116. As illustratively shown, VM (1) 604*b* has been allocated "B" MB of isolated LLC 116, VM (2) 604*c* has been allocated "C" MB of isolated LLC 116, and VM (3) 604*d* has been allocated "D" MB of isolated LLC 116, wherein "B," "C," and "D" represent positive integer values.

As described previously, the amount of direct to hardware I/O LLC cache ways 602 and amount of isolated LLC 116, or more particularly the cache ways associated with the isolated portions of the LLC 116 are determined based at least in part on hints generated by the NIC 216 and placed in a cache QoS register as described herein. Accordingly, referring now to FIG. 7, an illustrative cache QoS register 700 is shown that is usable by the host platform environment 600 of FIG. 6. As described previously, the cache QoS register 700 contains values for a direct to hardware I/O LLC cache ways 602 to be scaled for a specific destination address and the number of cache ways to be requested for a particular destination address (e.g., of one of the VMs 604 of FIG. 6). As such, the illustrative cache QoS register 700 includes a destination column 702 (e.g., a column of destination addresses) and a cache ways column 704 that identifies hints to the amount the amount of direct to hardware I/O LLC cache ways 602 and the amount of isolated LLC 116 that are to be allocated to the respective destination address (e.g., in a corresponding row of the cache QoS register 700) in the destination column 702.

It should be appreciated that to scale to other platforms, such as future generation platforms that provide I/O QoS via an input-output memory management unit (IOMMU), the hardware transaction flow could be customized. For example, the NIC 216 could perform a peripheral component interconnect express (PCIe) transaction to reach IOMMU (e.g., via memory management I/O switching fabric), have the intended resource management identifier get class of service tagged in the IOMMU (e.g., via memory management I/O switching fabric) and relay the information to the CPU (e.g., via on-chip interconnect mesh architecture topology) and an entity for enforcing the cache associations (e.g., a caching agent). Accordingly, in such embodiments, the NIC 216 could request cache QoS and support I/O QoS management.

It should be further appreciated that while illustratively described herein as being performed by the NIC 216, the functions described herein may be applied to any PCIe-based I/O device, such as storage devices, to provide proactive cache QoS requests. In some embodiments, the hints of higher or lower cache requests from the NIC 216 or any PCIe device (e.g., a storage device) could continue to use existing interfaces (e.g., a Representational State Transfer (RESTful) interface, a remote procedure call (RPC) interface, etc.) provided by the host managing the software, thereby keeping the present interfaces the same.

In such embodiments, the policy of which PCIe device would get priority and a corresponding order of precedence could be configured based on the nature of the host. For example, a storage node may get a higher priority for storage devices while a network node may get a higher priority for network devices. Additionally, the NIC 216, or other PCIe device, could also be adapted for I/O QoS methodologies, such as those that extend existing technologies. For example, Intel's® RDT infrastructure of resource monitoring IDs (RMIDs) to control PCIe bandwidth on a per I/O device basis. For example, the QoS register set could be extended to include recommendations on required PCIe bandwidth (e.g., based on corresponding heuristics).

EXAMPLES

Illustrative examples of the technologies disclosed herein are provided below. An embodiment of the technologies may include any one or more, and any combination of, the examples described below.

Example 1 includes a compute node for managing cache quality of service (QoS), the compute node comprising cache ways prediction circuitry of a network interface controller (NIC) of the compute node to identify a total amount of available shared cache ways of a last level cache (LLC) of the compute node, determine a workload type associated with each of a plurality of virtual machines (VMs) managed by the compute node based on network traffic to be received by the NIC and processed by each of the plurality of VMs, calculate a recommended amount of cache ways for each workload type, wherein the recommended amount of cache ways includes a recommended amount of hardware I/O LLC cache ways and a recommended amount of isolated LLC cache ways; and cache quality of service (QoS) register management circuitry of the NIC to update a cache QoS register of the NIC to include the recommended amount of cache ways for each workload type.

Example 2 includes the subject matter of Example 1, and wherein the cache quality of service (QoS) register management circuitry of the NIC is further to (i) generate an interrupt usable to indicate that the cache QoS register has been updated and (ii) transmit the generated interrupt to a kernel of the compute node.

Example 3 includes the subject matter of any of Examples 1 and 2, and wherein the kernel is to read, subsequent to having received the generated interrupt, a state of the cache QoS register on the NIC to retrieve the recommended amount of cache ways for each workload type; and determine, based on the read state of the cache QoS register, an optimal allocation set of cache ways, wherein the optimal allocation set of cache ways includes an amount of hardware I/O LLC cache ways that are to be allocated to each of the plurality of VMs and an amount of isolated LLC cache ways that are to be allocated to each of the plurality of VMs.

Example 4 includes the subject matter of any of Examples 1-3, and wherein to determine the optimal allocation set of cache ways comprises to transmit the recommended amount of cache ways for each workload type to a resource management daemon that is capable of managing resources of the compute node; receive the optimal allocation set from the resource management daemon; and determine the amount of hardware I/O LLC cache ways that are to be allocated to each of the plurality of VMs and the amount of isolated LLC cache ways that are to be allocated to each of the plurality of VMs based on the received optimal allocation set from the resource management daemon.

Example 5 includes the subject matter of any of Examples 1-4, and wherein the cache ways prediction circuitry is further to identify a destination address associated with a network packet received at a NIC of the compute node, wherein the destination address corresponds to a VM of the plurality of VMs; and wherein to update the cache QoS register of the NIC to include the recommended amount of cache ways for each workload type comprises to update the cache QoS register of the NIC to include the recommended amount of cache ways for each workload type based on the identified destination address of the VM of the plurality of VMs to which the workload type corresponds.

Example 6 includes the subject matter of any of Examples 1-5, and wherein the compute node further includes key performance indicator (KPI) monitoring circuitry to monitor telemetry data associated with network traffic received by the compute node based on a plurality of KPIs, and wherein the cache ways prediction circuitry is further to update a value corresponding to each of the plurality of KPIs based on the monitored telemetry data; identify a present amount of available shared cache ways of the LLC; determine an updated recommended amount of cache ways based on the present amount of available shared cache ways and the updated value of each of the plurality of KPIs.

Example 7 includes the subject matter of any of Examples 1-6, and wherein the plurality of KPIs include one or more metrics associated with a delay value, a jitter value, a throughput value, a latency value, an amount of dropped packets, an amount of transmission errors, an amount of receive errors, and a resource utilization value.

Example 8 includes the subject matter of any of Examples 1-7, and wherein to calculate the recommended amount of cache ways for each workload type comprises to calculate the recommended amount of cache ways for each workload type based on at least one of received shared resource data, received heuristic data, and an amount of total available shared cache ways.

Example 9 includes one or more machine-readable storage media comprising a plurality of instructions stored thereon that, in response to being executed, cause a compute node to identify, by a network interface controller (NIC) of the compute node, a total amount of available shared cache ways of a last level cache (LLC) of the compute node; determine, by the NIC, a workload type associated with each of a plurality of virtual machines (VMs) managed by the compute node based on network traffic to be received by the NIC and processed by each of the plurality of VMs; calculate, by the NIC, a recommended amount of cache ways for each workload type, wherein the recommended amount of cache ways includes a recommended amount of hardware I/O LLC cache ways and a recommended amount of isolated LLC cache ways; and update, by the NIC, a cache QoS register of the NIC to include the recommended amount of cache ways for each workload type.

Example 10 includes the subject matter of Example 9, and wherein the plurality of instructions further cause the compute node to (i) generate, by the NIC, an interrupt usable to indicate that the cache QoS register has been updated and (ii) transmit, by the NIC, the generated interrupt to a kernel of the compute node.

Example 11 includes the subject matter of any of Examples 9 and 10, and wherein the kernel is to read, subsequent to having received the generated interrupt, a state of the cache QoS register on the NIC to retrieve the recommended amount of cache ways for each workload type; and determine, based on the read state of the cache QoS register, an optimal allocation set of cache ways, wherein the optimal allocation set of cache ways includes an amount of hardware I/O LLC cache ways that are to be allocated to each of the plurality of VMs and an amount of isolated LLC cache ways that are to be allocated to each of the plurality of VMs.

Example 12 includes the subject matter of any of Examples 9-11, and wherein to determine the optimal allocation set of cache ways comprises to transmit the recommended amount of cache ways for each workload type to a resource management daemon that is capable of managing resources of the compute node; receive the optimal allocation set from the resource management daemon; and determine the amount of hardware I/O LLC cache ways that are to be allocated to each of the plurality of VMs and the amount of isolated LLC cache ways that are to be allocated to each of the plurality of VMs based on the received optimal allocation set from the resource management daemon.

Example 13 includes the subject matter of any of Examples 9-12, and wherein the plurality of instructions further cause the compute node to identify a destination address associated with a network packet received at a NIC of the compute node, wherein the destination address corresponds to a VM of the plurality of VMs; and wherein to update the cache QoS register of the NIC to include the recommended amount of cache ways for each workload type comprises to update the cache QoS register of the NIC to include the recommended amount of cache ways for each workload type based on the identified destination address of the VM of the plurality of VMs to which the workload type corresponds.

Example 14 includes the subject matter of any of Examples 9-13, and wherein the plurality of instructions further cause the compute node to monitor telemetry data associated with network traffic received by the compute node based on a plurality of KPIs; update a value corresponding to each of the plurality of KPIs based on the monitored telemetry data; identify a present amount of available shared cache ways of the LLC; and determine an updated recommended amount of cache ways based on the present amount of available shared cache ways and the updated value of each of the plurality of KPIs.

Example 15 includes the subject matter of any of Examples 9-14, and wherein the plurality of KPIs include one or more metrics associated with a delay value, a jitter value, a throughput value, a latency value, an amount of dropped packets, an amount of transmission errors, an amount of receive errors, and a resource utilization value.

Example 16 includes the subject matter of any of Examples 9-15, and wherein to calculate the recommended amount of cache ways for each workload type comprises to calculate the recommended amount of cache ways for each workload type based on at least one of received shared resource data, received heuristic data, and an amount of total available shared cache ways.

Example 17 includes a method for managing cache quality of service (QoS), the method comprising identifying, by a network interface controller (NIC) of a compute node, a total amount of available shared cache ways of a last level cache (LLC) of the compute node; determining, by the NIC, a workload type associated with each of a plurality of virtual machines (VMs) managed by the compute node based on network traffic to be received by the NIC and processed by each of the plurality of VMs; calculating, by the NIC, a recommended amount of cache ways for each workload type, wherein the recommended amount of cache ways includes a recommended amount of hardware I/O LLC cache ways and a recommended amount of isolated LLC cache ways; and updating, by the NIC, a cache QoS register of the NIC to include the recommended amount of cache ways for each workload type.

Example 18 includes the subject matter of Example 17, and further including (i) generating, by the NIC, an interrupt usable to indicate that the cache QoS register has been updated and (ii) transmitting, by the NIC, the generated interrupt to a kernel of the compute node.

Example 19 includes the subject matter of any of Examples 17 and 18, and further including reading, by the kernel and subsequent to having received the generated interrupt, a state of the cache QoS register on the NIC to retrieve the recommended amount of cache ways for each workload type; and determining, by the kernel and based on the read state of the cache QoS register, an optimal allocation set of cache ways, wherein the optimal allocation set of cache ways includes an amount of hardware I/O LLC cache ways that are to be allocated to each of the plurality of VMs and an amount of isolated LLC cache ways that are to be allocated to each of the plurality of VMs.

Example 20 includes the subject matter of any of Examples 17-19, and wherein determining the optimal allocation set of cache ways comprises transmitting the recommended amount of cache ways for each workload type to a resource management daemon that is capable of managing resources of the compute node; receiving the optimal allocation set from the resource management daemon; and determining the amount of hardware I/O LLC cache ways that are to be allocated to each of the plurality of VMs and the amount of isolated LLC cache ways that are to be allocated to each of the plurality of VMs based on the received optimal allocation set from the resource management daemon.

Example 21 includes the subject matter of any of Examples 17-20, and further including identifying, by the NIC, a destination address associated with a network packet received at a NIC of the compute node, wherein the destination address corresponds to a VM of the plurality of VMs, wherein updating the cache QoS register of the NIC to include the recommended amount of cache ways for each workload type comprises updating the cache QoS register of the NIC to include the recommended amount of cache ways for each workload type based on the identified destination address of the VM of the plurality of VMs to which the workload type corresponds.

Example 22 includes the subject matter of any of Examples 17-21, and further including monitoring, by the NIC, telemetry data associated with network traffic received by the compute node based on a plurality of KPIs; updating, by the NIC, a value corresponding to each of the plurality of KPIs based on the monitored telemetry data; identifying, by the NIC, a present amount of available shared cache ways of the LLC; and determining, by the NIC, an updated recommended amount of cache ways based on the present amount of available shared cache ways and the updated value of each of the plurality of KPIs.

Example 23 includes the subject matter of any of Examples 17-22, and wherein the plurality of KPIs include one or more metrics associated with a delay value, a jitter value, a throughput value, a latency value, an amount of dropped packets, an amount of transmission errors, an amount of receive errors, and a resource utilization value.

Example 24 includes the subject matter of any of Examples 17-23, and wherein calculating the recommended amount of cache ways for each workload type comprises calculating the recommended amount of cache ways for each workload type based on at least one of received shared resource data, received heuristic data, and an amount of total available shared cache ways.

The invention claimed is:

1. A network interface controller (NIC) at a compute node, the NIC comprising:
  at least one register; and
  circuitry to:
    identify an amount of available cache ways of a last level cache (LLC) of a processor at the compute node;
    determine a workload type associated with each of a plurality of virtual machines (VMs) managed by the compute node based on received network traffic to be processed by each of the plurality of VMs;
    identify an amount of LLC cache ways for each workload type; and
    update the at least one register to indicate the identified amount of LLC cache ways for each workload type.

2. The NIC of claim 1, further comprising the circuitry to:
  generate an interrupt usable to indicate that the at least one register has been updated; and
  transmit the generated interrupt to a kernel of the compute node.

3. The NIC of claim 2, wherein to transmit the generated interrupt to the kernel causes the kernel to:
  read, subsequent to having received the generated interrupt, a state of the at least one register to retrieve the identified amount of LLC cache ways for each workload type;
  determine, based on the read state of the at least one register, a recommended allocation set of LLC cache ways, wherein the recommended allocation set of LLC cache ways includes an amount of hardware I/O LLC cache ways that are to be allocated to each of the plurality of VMs and an amount of isolated LLC cache ways that are to be allocated to each of the plurality of VMs; and
  transmit the recommended allocation set of LLC cache ways to a resource management daemon that is capable of managing resources of the compute node, wherein the resource management daemon allocates LLC cache ways of the processor for each workload based on the recommended allocation set of LLC cache ways.

4. The NIC of claim 1, further comprising the circuitry to:
  identify a destination address associated with a network packet received, wherein the destination address corresponds to a VM of the plurality of VMs; and
  wherein to update the at least one register to indicate the amount of LLC cache ways for each workload type also includes the circuitry to update the at least one register to include the amount of LLC cache ways for each workload type based on the identified destination address of the VM of the plurality of VMs to which the workload type corresponds.

5. The NIC of claim 1, further comprising the circuitry to:
  monitor telemetry data associated with network traffic received based on a plurality of key performance indicators (KPIs);
  update a value corresponding to each of the plurality of KPIs based on the monitored telemetry data;
  identify a present amount of available shared cache ways of the LLC; and
  determine an updated amount of LLC cache ways based on the present amount of available LLC cache ways and the updated value of each of the plurality of KPIs.

6. The NIC of claim 5, wherein the plurality of KPIs include one or more metrics associated with a delay value, a jitter value, a throughput value, a latency value, an amount of dropped packets, an amount of transmission errors, an amount of receive errors, and a resource utilization value.

7. The NIC of claim 1, wherein to identify the amount of LLC cache ways for each workload type comprises to identify the amount of LLC cache ways for each workload type based on at least one of received shared resource data, received heuristic data, and an amount of available LLC cache ways of the processor.

8. One or more non-transitory machine-readable storage media comprising a plurality of instructions stored thereon that, in response to being executed, cause a network interface controller (NIC) at a compute node to:
  identify an amount of available cache ways of a last level cache (LLC) of a processor at the compute node;
  determine a workload type associated with each of a plurality of virtual machines (VMs) managed by the compute node based on received network traffic to be processed by each of the plurality of VMs;
  identify an amount of LLC cache ways for each workload type; and
  update a at least one register of the NIC to indicate the identified amount of LLC cache ways for each workload type.

9. The one or more non-transitory machine-readable storage media of claim 8, wherein the plurality of instructions further cause the NIC to:
  generate an interrupt usable to indicate that the at least one register has been updated; and
  transmit the generated interrupt to a kernel of the compute node.

10. The one or more non-transitory machine-readable storage media of claim 9, wherein to transmit the generated interrupt to the kernel causes the kernel to:
  read, subsequent to having received the generated interrupt, a state of the at least one register to retrieve the identified amount of LLC cache ways for each workload type;
  determine, based on the read state of the at least one register, a recommended allocation set of LLC cache ways, wherein the recommended allocation set of LLC cache ways includes an amount of hardware I/O LLC cache ways that are to be allocated to each of the plurality of VMs and an amount of isolated LLC cache ways that are to be allocated to each of the plurality of VMs; and
  transmit the recommended allocation set of LLC cache ways to a resource management daemon that is capable of managing resources of the compute node, wherein the resource management daemon allocates LLC cache ways of the processor for each workload based on the recommended allocation set of LLC cache ways.

11. The one or more non-transitory machine-readable storage media of claim 8, wherein the plurality of instructions further cause the NIC to:
identify a destination address associated with a network packet received, wherein the destination address corresponds to a VM of the plurality of VMs; and
wherein to update the at least one register to indicate the amount of LLC cache ways for each workload type also includes the NIC to update the at least one register to include the amount of LLC cache ways for each workload type based on the identified destination address of the VM of the plurality of VMs to which the workload type corresponds.

12. The one or more non-transitory machine-readable storage media of claim 8, wherein the plurality of instructions further cause the NIC to:
monitor telemetry data associated with network traffic received based on a plurality of key performance indicators (KPIs);
update a value corresponding to each of the plurality of KPIs based on the monitored telemetry data;
identify a present amount of available shared cache ways of the LLC; and
determine an updated amount of LLC cache ways based on the present amount of available LLC cache ways and the updated value of each of the plurality of KPIs.

13. The one or more non-transitory machine-readable storage media of claim 12, wherein the plurality of KPIs include one or more metrics associated with a delay value, a jitter value, a throughput value, a latency value, an amount of dropped packets, an amount of transmission errors, an amount of receive errors, and a resource utilization value.

14. The one or more non-transitory machine-readable storage media of claim 8, wherein to identify the amount of LLC cache ways for each workload type comprises to identify the amount of LLC cache ways for each workload type based on at least one of received shared resource data, received heuristic data, and an amount of total available LLC cache ways of the processor.

15. A method comprising:
identifying, by a network interface controller (NIC) at a compute node, an amount of available cache ways of a last level cache (LLC) of a processor at the compute node;
determining, by the NIC, a workload type associated with each of a plurality of virtual machines (VMs) managed by the compute node based on received network traffic to be processed by each of the plurality of VMs;
identifying, by the NIC, an amount of LLC cache ways for each workload type; and
updating, by the NIC, at least one register of the NIC to indicate the identified amount of LLC cache ways for each workload type.

16. The method of claim 15, further comprising:
generating, by the NIC, an interrupt usable to indicate that the at least one register has been updated; and
transmitting, by the NIC, the generated interrupt to a kernel of the compute node.

17. The method of claim 16, further comprising the kernel:
reading, subsequent to having received the generated interrupt, a state of the at least one register to retrieve the identified amount of LLC cache ways for each workload type; determining, based on the read state of the at least one register, a recommended allocation set of LLC cache ways, wherein the recommended allocation set of LLC cache ways includes an amount of hardware I/O LLC cache ways that are to be allocated to each of the plurality of VMs and an amount of isolated LLC cache ways that are to be allocated to each of the plurality of VMs; and
transmitting the recommended allocation set of LLC cache ways to a resource management daemon that is capable of managing resources of the compute node, wherein the resource management daemon allocates LLC cache ways of the processor for each workload based on the recommended allocation set of LLC cache ways.

18. The method of claim 15, further comprising:
identifying, by the NIC, a destination address associated with a network packet received, wherein the destination address corresponds to a VM of the plurality of VMs, wherein updating the at least one register to indicate the amount of LLC cache ways for each workload type also includes updating the at least one register to include the amount of LLC cache ways for each workload type based on the identified destination address of the VM of the plurality of VMs to which the workload type corresponds.

19. The method of claim 15, further comprising:
monitoring, by the NIC, telemetry data associated with network traffic received based on a plurality of key performance indicators (KPIs);
updating, by the NIC, a value corresponding to each of the plurality of KPIs based on the monitored telemetry data;
identifying, by the NIC, a present amount of available shared cache ways of the LLC; and
determining, by the NIC, an updated amount of LLC cache ways based on the present amount of available LLC cache ways and the updated value of each of the plurality of KPIs.

20. The method of claim 19, wherein the plurality of KPIs include one or more metrics associated with a delay value, a jitter value, a throughput value, a latency value, an amount of dropped packets, an amount of transmission errors, an amount of receive errors, and a resource utilization value.

21. The method of claim 15, wherein identifying the amount of LLC cache ways for each workload type comprises identifying the amount of LLC cache ways for each workload type based on at least one of received shared resource data, received heuristic data, and an amount of total available LLC cache ways of the processor.

22. A network interface controller (NIC) at a compute node, the NIC comprising:
an input/output (1/0) interface to couple with a last level cache (LLC) of a processor at the compute node; and
circuitry to:
identify an amount of LLC cache ways of the processor, the identified amount of LLC cache ways for use to process packets, wherein the LLC cache ways are accessible via the I/O interface; and
indicate the identified amount of LLC cache ways to cause an allocation of LLC cache ways for use to process packets.

23. The NIC of claim 22, further comprising:
at least one register; and
the circuitry to update the at least one register to include values in order to indicate the identified amount of LLC cache ways for use to process packets.

24. The NIC of claim 23, further comprising the circuitry to:
generate an interrupt usable to indicate that the at least one register has been updated.

25. The NIC of claim 22, wherein the circuitry is to identify the amount of LLC cache ways for use to process packets based on packet traffic.

26. The NIC of claim 25, wherein the packet traffic is to a plurality of destinations at the compute node, the plurality of destinations to include at least one virtual machine (VM).

27. The NIC of claim 26, further comprising the circuitry to:
monitor telemetry data associated with the packet traffic to the plurality of destinations to identify the amount of LLC cache ways for use to process packets based on one or more metrics associated with a delay value, a jitter value, a throughput value, a latency value, an amount of dropped packets an amount of transmission errors, or a resource utilization rate.

* * * * *

UNITED STATES PATENT AND TRADEMARK OFFICE
CERTIFICATE OF CORRECTION

PATENT NO. : 11,888,710 B2
APPLICATION NO. : 16/140938
DATED : January 30, 2024
INVENTOR(S) : Iosif Gasparakis, Malini K. Bhandaru and Ranganath Sunku Page 1 of 4

It is certified that error appears in the above-identified patent and that said Letters Patent is hereby corrected as shown below:

In the Claims

Claim 1 should read: A network interface controller (NIC) at a compute node, the NIC comprising:
at least one register; and
    circuitry to:
identify a total amount of available cache ways of a last level cache (LLC) of a processor at the compute node;
determine a workload type associated with each of a plurality of virtual machines (VMs) managed by the compute node based on received network traffic to be processed by each of the plurality of VMs;
    identify a recommended amount of LLC cache ways for each workload type; and
update the at least one register to indicate the identified recommended amount of LLC cache ways for each workload type.

Claim 3 should read: The NIC of claim 2, wherein to transmit the generated interrupt to the kernel causes the kernel to:
read, subsequent to having received the generated interrupt, a state of the at least one register to retrieve the identified recommended amount of LLC cache ways for each workload type;
determine, based on the read state of the at least one register, a recommended allocation set of LLC cache ways, wherein the recommended allocation set of LLC cache ways includes an amount of hardware I/O LLC cache ways that are to be allocated to each of the plurality of VMs and an amount of isolated LLC cache ways that are to be allocated to each of the plurality of VMs; and
transmit the recommended allocation set of LLC cache ways to a resource management daemon that is capable of managing resources of the compute node, wherein the resource management daemon allocates LLC cache ways of the processor for each workload based on the recommended allocation set of LLC cache ways.

Claim 4 should read: The NIC of claim 1, further comprising the circuitry to:
identify a destination address associated with a network packet received, wherein the destination address corresponds to a VM of the plurality of VMs; and
wherein to update the at least one register to indicate the recommended amount of LLC cache ways for Signed and Sealed this
Fourteenth Day of May, 2024

Katherine Kelly Vidal
*Director of the United States Patent and Trademark Office* each workload type also includes the circuitry to update the at least one register to include the recommended amount of LLC cache ways for each workload type based on the identified destination address of the VM of the plurality of VMs to which the workload type corresponds.

Claim 5 should read: The NIC of claim 1, further comprising the circuitry to:
monitor telemetry data associated with network traffic received based on a plurality of key performance indicators (KPIs);
update a value corresponding to each of the plurality of KPIs based on the monitored telemetry data;
identify a present amount of available shared cache ways of the LLC; and
determine an updated recommended amount of LLC cache ways based on the present amount of available LLC cache ways and the updated value of each of the plurality of KPIs.

Claim 7 should read: The NIC of claim 1, wherein to identify the recommended amount of LLC cache ways for each workload type comprises to identify the recommended amount of LLC cache ways for each workload type based on at least one of received shared resource data, received heuristic data, and an amount of total available LLC cache ways of the processor.

Claim 10 should read: The one or more non-transitory machine-readable storage media of claim 9, wherein to transmit the generated interrupt to the kernel causes the kernel to:
read, subsequent to having received the generated interrupt, a state of the at least one register to retrieve the identified recommended amount of LLC cache ways for each workload type;
determine, based on the read state of the at least one register, a recommended allocation set of LLC cache ways, wherein the recommended allocation set of LLC cache ways includes an amount of hardware I/O LLC cache ways that are to be allocated to each of the plurality of VMs and an amount of isolated LLC cache ways that are to be allocated to each of the plurality of VMs; and
transmit the recommended allocation set of LLC cache ways to a resource management daemon that is capable of managing resources of the compute node, wherein the resource management daemon allocates LLC cache ways of the processor for each workload based on the recommended allocation set of LLC cache ways.

Claim 11 should read: The one or more non-transitory machine-readable storage media of claim 8, wherein the plurality of instructions further cause the NIC to:
identify a destination address associated with a network packet received, wherein the destination address corresponds to a VM of the plurality of VMs; and
wherein to update the at least one register to indicate the recommended amount of LLC cache ways for each workload type also includes the NIC to update the at least one register to include the recommended amount of LLC cache ways for each workload type based on the identified destination address of the VM of the plurality of VMs to which the workload type corresponds.

Claim 12 should read: The one or more non-transitory machine-readable storage media of claim 8, wherein the plurality of instructions further cause the NIC to:
monitor telemetry data associated with network traffic received based on a plurality of key performance indicators (KPIs);
update a value corresponding to each of the plurality of KPIs based on the monitored telemetry data;
identify a present amount of available shared cache ways of the LLC; and

CERTIFICATE OF CORRECTION (continued)
U.S. Pat. No. 11,888,710 B2 determine an updated recommended amount of LLC cache ways based on the present amount of available LLC cache ways and the updated value of each of the plurality of KPIs.

Claim 14 should read: The one or more non-transitory machine-readable storage media of claim 8, wherein to identify the recommended amount of LLC cache ways for each workload type comprises to identify the recommended amount of LLC cache ways for each workload type based on at least one of received shared resource data, received heuristic data, and an amount of total available LLC cache ways of the processor.

Claim 15 should read: A method comprising:
identifying, by a network interface controller (NIC) at a compute node, a total amount of available cache ways of a last level cache (LLC) of a processor at the compute node;
determining, by the NIC, a workload type associated with each of a plurality of virtual machines (VMs) managed by the compute node based on received network traffic to be processed by each of the plurality of VMS;
 identifying, by the NIC, a recommended amount of LLC cache ways for each workload type; and
updating, by the NIC, at least one register of the NIC to indicate the identified recommended amount of LLC cache ways for each workload type.

Claim 17 should read: The method of claim 16, further comprising the kernel:
reading, subsequent to having received the generated interrupt, a state of the at least one register to retrieve the identified recommended amount of LLC cache ways for each workload type; determining, based on the read state of the at least one register, a recommended allocation set of LLC cache ways, wherein the recommended allocation set of LLC cache ways includes an amount of hardware I/O LLC cache ways that are to be allocated to each of the plurality of VMs and an amount of isolated LLC cache ways that are to be allocated to each of the plurality of VMs; and
transmitting the recommended allocation set of LLC cache ways to a resource management daemon that is capable of managing resources of the compute node, wherein the resource management daemon allocates LLC cache ways of the processor for each workload based on the recommended allocation set of LLC cache ways.

Claim 18 should read: The method of claim 15, further comprising:
identifying, by the NIC, a destination address associated with a network packet received, wherein the destination address corresponds to a VM of the plurality of VMs,
wherein updating the at least one register to indicate the recommended amount of LLC cache ways for each workload type also includes updating the at least one register to include the recommended amount of LLC cache ways for each workload type based on the identified destination address of the VM of the plurality of VMs to which the workload type corresponds.

Claim 19 should read: The method of claim 15, further comprising:
monitoring, by the NIC, telemetry data associated with network traffic received based on a plurality of key performance indicators (KPIs);
updating, by the NIC, a value corresponding to each of the plurality of KPIs based on the monitored telemetry data;
identifying, by the NIC, a present amount of available shared cache ways of the LLC; and determining, by the NIC, an updated recommended amount of LLC cache ways based on the present amount of available LLC cache ways and the updated value of each of the plurality of KPIs.

Claim 21 should read: The method of claim 15, wherein identifying the recommended amount of LLC cache ways for each workload type comprises identifying the recommended amount of LLC cache ways for each workload type based on at least one of received shared resource data, received heuristic data, and an amount of total available LLC cache ways of the processor.

Claim 22 should read: A network interface controller (NIC) at a compute node, the NIC comprising:
an input/output (I/O) interface to couple with a last level cache (LLC) of a processor at the compute node; and
    circuitry to:
identify an amount of LLC cache ways of the processor, the identified amount of LLC cache ways for use to process packets, wherein the LLC cache ways are accessible via the I/O interface; and
indicate the identified amount of LLC cache ways to cause an allocation of LLC cache ways for use to process packets.